US009752028B2

(12) United States Patent
You et al.

(10) Patent No.: US 9,752,028 B2
(45) Date of Patent: Sep. 5, 2017

(54) HALOGEN-FREE THERMOSETTING RESIN COMPOSITION, PREPREG AND LAMINATE FOR PRINTED CIRCUIT PREPARED FROM THE SAME

(71) Applicant: Shengyi Technology Co., Ltd., Dongguan (CN)

(72) Inventors: Jiang You, Dongguan (CN); Tianhui Huang, Dongguan (CN); Zhongqiang Yang, Dongguan (CN)

(73) Assignee: SHENGYI TECHNOLOGY CO., LTD. (CN)

( * ) Notice: Subject to any disclaimer, the term of this patent is extended or adjusted under 35 U.S.C. 154(b) by 0 days.

(21) Appl. No.: 14/679,387

(22) Filed: Apr. 6, 2015

(65) Prior Publication Data
US 2016/0185953 A1 Jun. 30, 2016

(30) Foreign Application Priority Data

Dec. 29, 2014 (CN) .......................... 2014 1 0844127

(51) Int. Cl.
C08L 63/00 (2006.01)
C08L 63/04 (2006.01)
C08G 59/40 (2006.01)
C08G 59/62 (2006.01)
C08K 5/00 (2006.01)

(52) U.S. Cl.
CPC .......... C08L 63/04 (2013.01); C08G 59/4071 (2013.01); C08G 59/621 (2013.01); C08K 5/0066 (2013.01); C08L 63/00 (2013.01)

(58) Field of Classification Search
CPC .................................. C08L 63/00; C08L 63/04
See application file for complete search history.

(56) References Cited

U.S. PATENT DOCUMENTS

| 2006/0099458 A1* | 5/2006 | Hanson | B32B 5/28 428/704 |
| 2007/0219295 A1* | 9/2007 | Levchik | C08G 59/4071 523/451 |
| 2013/0338330 A1* | 12/2013 | Nakagawa | C07C 263/10 528/65 |
| 2015/0189747 A1* | 7/2015 | Zeng | C08K 9/06 428/412 |
| 2016/0185953 A1* | 6/2016 | You | C08L 63/04 523/451 |

FOREIGN PATENT DOCUMENTS

| CN | 1795223 A | 6/2006 | |
| CN | 102101935 A | 6/2011 | |
| CN | 102477211 A | 5/2012 | |
| CN | 102093669 B | 8/2012 | |
| CN | 103073846 A | 5/2013 | |
| CN | 103122010 A | 5/2013 | |
| CN | 101679675 B | 6/2013 | |
| CN | 103709747 A * | 4/2014 | .............. C08K 9/06 |
| CN | 103796257 A | 5/2014 | |
| CN | 103992622 A | 8/2014 | |
| JP | 2005105099 A | 4/2005 | |
| JP | 2012153829 A | 8/2012 | |
| JP | 2013060571 A | 4/2013 | |
| KR | 1020120090199 A | 8/2012 | |
| KR | 101361399 B1 | 2/2014 | |
| KR | 1020140093656 A | 7/2014 | |

OTHER PUBLICATIONS

International Search Report; Mailed Sep. 24, 2015 for PCT Application No. PCT/CN2015/080539.
European Search Report Jul. 31, 2015 for EP Application No. EP15160975.7.

* cited by examiner

Primary Examiner — Megan McCulley
(74) Attorney, Agent, or Firm — Mendelsohn Dunleavy P.C.

(57) ABSTRACT

The present invention relates to a halogen-free thermosetting resin composition, and also a prepreg and a laminate for printed circuit prepared from the halogen-free thermosetting resin composition. The halogen-free thermosetting resin composition comprises, based on 100 parts by weight of organic solids, (A) from 30 to 60 parts by weight of a halogen-free epoxy resin, (B) from 5 to 30 parts by weight of a first curing agent of phosphorus-containing bisphenol, (C) from 5 to 30 parts by weight of a second curing agent of alkylphenol novolac, and (D) a phosphorus-containing flame retardant. The prepreg and laminate for printed circuit prepared from the halogen-free thermosetting resin composition according to the present invention have high glass transition temperature, excellent dielectric properties, low water absorption, high thermal resistance and better process workability, and can fulfill halogen-free flame retardance and achieve the grade of UL94 V-0.

10 Claims, No Drawings

HALOGEN-FREE THERMOSETTING RESIN COMPOSITION, PREPREG AND LAMINATE FOR PRINTED CIRCUIT PREPARED FROM THE SAME

TECHNICAL FIELD

The present invention relates to a halogen-free thermosetting resin composition, and also a prepreg and a laminate for printed circuit prepared from the halogen-free thermosetting resin composition.

BACKGROUND ART

For conventional laminates for printed circuit, brominated flame retardants, especially tetrabromobisphenol-A epoxy resin, are usually used to achieve flame retardance. Such brominated epoxy resin has better flame retardancy, but will produce hydrogen bromide during combustion. In addition, carcinogens, such as dioxin, dibenzofuran and the like, have been detected in the combustion products of waste electrical and electronic equipment containing halogens, such as bromide, fluorine and the like. Thus the application of brominated epoxy resin has been limited. Two Environmental Directives, Waste Electrical and Electronic Equipment Directive and The Restriction of the use of certain Hazardous substances in Electrical and Electronic Equipment, were formally implemented on Jul. 1, 2006. The development of halogen-free flame-retardant copper clad laminates became the hot spot in the industry, and the cooper clad laminate manufacturers have launched their own halogen-free flame-retardant copper clad laminates in succession.

With the high speed and multifunctional development of information processing of consumer electronic product, the application frequencies are continuously increased. Besides increasing environmental requirements, there are increasingly requirements on low dielectric constant and dielectric dissipation value. Thus it becomes the hot pursuit to decrease Dk/Df in the substrate industry. For conventional FR-4 materials, dicyandiamide is mostly used as the curing agent. Such curing agent has three-level reactive amine, and has better process operability. However, the cured products have a lower thermal decomposition temperature due to its weaker C—N bond which is easy to split under high temperature, so that they cannot meet the requirements on thermal resistance for lead-free processes. In this context, it began to use phenolic resin as the epoxy curing agent in the industry with the large scale implementation of lead-free process in 2006. Phenolic resin has the benzene ring structure of high density, so that the epoxy-cured system has excellent thermal resistance. However, the dielectric properties of the cured products have the tendency of being deteriorated.

CONTENTS OF THE INVENTION

Upon studies, the applicant found that phosphorus-containing bisphenol may be used as the curing agent of epoxy resins, wherein reaction groups include hydroxyl groups and phosphorus units at both sides, without any production of secondary hydroxyl groups during the reaction. The cured products have a high glass transition temperature, and excellent dielectric performance and thermal resistance. In addition, phosphorus-containing bisphenol has a high phosphorus content and has the effects of halogen-free flame retardance when used as the curing agent, so as to greatly decrease the addition amount of flame retardant.

On such a basis, one object of the present invention is to provide a halogen-free thermosetting resin composition, and also a prepreg and a laminate for printed circuit prepared from the halogen-free thermosetting resin composition. The laminate for printed circuit prepared by using such resin composition has a high glass transition temperature, excellent dielectric performance, low water absorption, high thermal resistance and better process workability. In addition, it can also fulfill the halogen-free flame retardance and achieve UL94 V-0.

In order to achieve such object, the inventor conducted extensive studies and found that the composition obtained by suitably mixing halogen-free epoxy resin, phosphorus-containing bisphenol, alkylphenol novolac, phosphorus-containing flame retardant, and optionally other substances can achieve such object.

That is to say, the following technical solution is used in the present invention: a halogen-free thermosetting resin composition, comprising the following four substances as the essential components, based on 100 parts by weight of organic solids, (A) from 30 to 60 parts by weight of a halogen-free epoxy resin, (B) from 5 to 30 parts by weight of a first curing agent of phosphorus-containing bisphenol, (C) from 5 to 30 parts by weight of a second curing agent of alkylphenol novolac; and (D) a phosphorus-containing flame retardant The halogen-free thermosetting resin composition of the present invention uses halogen-free epoxy resin having specific molecular structure, has higher functionality and better dielectric performance. The cured products have a higher Tg and a low water absorption.

The halogen-free thermosetting resin composition of the present invention uses phosphorus-containing biphenol as the first curing agent. Such phosphorus-containing bisphenol has a high structural symmetry. Moreover, phosphorus in the molecule may react with secondary hydroxyl in epoxy resin, and the cured products have a high Tg and excellent dielectric performance. In addition, such phosphorus-containing bisphenol has a high phosphorus content, and has the effect of halogen-free flame retardant property.

In addition, the halogen-free thermosetting resin composition of the present invention uses alkylphenol novolac as the second curing agent, which sufficiently takes the advantages of excellent dielectric performance and low water absorption due to more alkyl branched chains in the structure thereof, so as to greatly decrease the water absorption of the cured products without sacrificing the Tg and dielectric performance of the cured products.

By using the synergistic effects between phosphorus-containing bisphenol and alkylphenol novolac, the present invention can notably increase the glass transition temperature and thermal resistance of the prepreg and laminate for printed circuit prepared by using such resin composition, and make them have excellent dielectric performance, low water absorption and better process workability. In addition, it can also fulfill the halogen-free flame retardance and achieve UL94 V-0.

Additionally, phosphorus-containing bisphenol and epoxy resin have a high curing reaction rate, while alkylphenol novolac and epoxy resin have a low curing reaction rate. Phosphorus-containing bisphenol and alkylphenol novolac are simultaneously used to cure epoxy resin, so as to achieve proper curing reaction rate and make it easy to control, and to greatly decrease the difficulties of the production and processing.

Each component is detailedly disclosed as follows.

For component (A) in the present invention, i.e. halogen-free epoxy resin, the amount thereof is from 30 to 60 parts by weight, e.g. 32, 34, 36, 38, 40, 42, 44, 46, 48, 50, 52, 54, 56 or 58 parts by weight. Preferably, the halogen-free epoxy resin is one selected from or the mixture of at least two selected from bisphenol-A epoxy resin, bisphenol-F epoxy resin, o-cresol novolac epoxy resin, bisphenol-A novolac epoxy resin, trisphenol novolac epoxy resin, dicyclopentadiene novolac epoxy resin, biphenyl novolac epoxy resin, alkylbenzene novolac epoxy resin and naphthol novolac epoxy resin. The aforesaid epoxy resins all are halogen-free.

Preferably, the halogen-free epoxy resin is selected from the epoxy resin having the following structure,

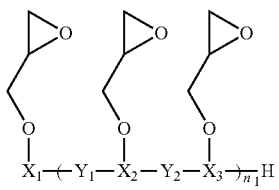

wherein, $X_1$, $X_2$ and $X_3$ are each independently selected from

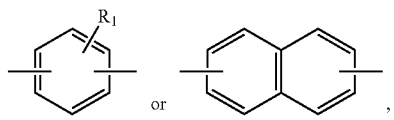

$R_1$ is selected from hydrogen atom, substituted or unsubstituted C1-C5 (e.g. C2, C3, C4) linear alkyl, and substituted or unsubstituted C1-5 (e.g. C2, C3, C4) branched alkyl;

$Y_1$ and $Y_2$ are each independently selected from single bonds, —$CH_2$—,

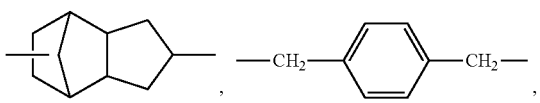

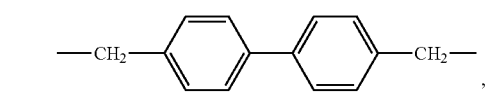

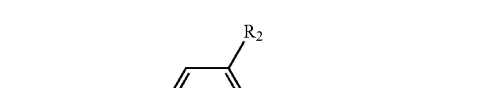

and

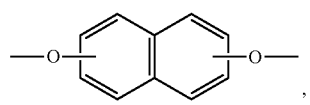

wherein $n_1$ is an integer from 1 to 10, e.g. 2, 3, 4, 5, 6, 7, 8 or 9; $R_2$ is selected from hydrogen atom, substituted or unsubstituted C1-05 (e.g. C2, C3, C4) linear alkyl, and substituted or unsubstituted C1-5(e.g. C2, C3, C4) branched alkyl.

The halogen-free thermosetting resin composition of the present invention has the aforesaid specific molecular structure, has a higher functionality and better dielectric performance. The cured products thereof have a higher Tg and a low water absorption.

Component (B) in the present invention is a phosphorus-containing bisphenol curing agent.

Preferably, the phosphorus-containing bisphenol has the following structure

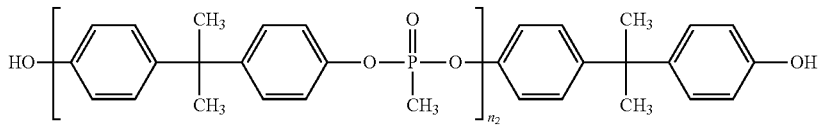

wherein $n_2$ is an integer of 2 to 20, e.g. 3, 4, 5, 6, 7, 8, 9, 10, 11, 12, 13, 14, 15, 16, 17, 18 or 19, preferably an integer of from 3 to 10.

Preferably, the phosphorus-containing bisphenol has a weight average molecular weight of from 1000 to 6500, preferably from 1000 to 4500, more preferably from 1000 to 3000. When the weight average molecular weight is less than 1000, the cured products have a low Tg and a worse thermal resistance; when the weight average molecular weight is higher than 6500, the phosphorus-containing bisphenol has a worse solubility in organic solvents, so that a better and homogeneous varnish cannot be obtained, and the process requirements on the copper-clad plates cannot be met.

The phosphorus-containing bisphenol in the present invention is added in an amount of from 5 to 30 parts by weight, e.g. 6, 7, 9, 11, 12, 13, 15, 17, 18, 19, 21, 23, 24, 25, 27, 29 or 30 parts by weight. If the addition amount is too less, there is no obvious effect on the increase of the glass transition temperature and dielectric performance of cured products; if the addition amount is too high, the cured products have a higher water absorption.

Component (C) in the present invention, i.e. the second curing agent, is alkylphenol novolac.

Preferably, the alkylphenol novolac has the following structure

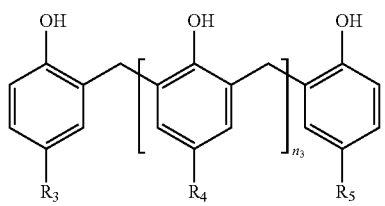

wherein $R_3$, $R_4$ and $R_5$ are all independently selected from substituted or unsubstituted linear or branched alkyl groups having 4-8 (e.g. 5, 6 or 7) carbon atoms, preferably n-butyl or n-octyl; $n_3$ is an integer from 2 to 20, e.g. 3, 4, 5, 6, 7, 8, 9, 10, 11, 12, 13, 14, 15, 16, 17, 18 or 19.

The component (C) alkylphenol novolac curing agent in the present invention is added in an amount of from 5 to 30 parts by weight, e.g. 5, 7, 8, 9, 11, 13, 14, 15, 17, 19, 20, 21, 23, 25, 26, 27 or 29 parts by weight. In the structure of alkylphenol novolac, alkyl branched chain has excellent dielectric performance, but a low binding force and is easy to combust. If the addition amount is too less, the cured products have a worse dielectric performance and a high water absorption; if the addition amount is too high, the cured products have a low binding force and worse flame retardant property.

Component (D) in the present invention, i.e. phosphorus-containing flame retardant, makes the resin composition have the flame retardant properties and meet the UL 94 V-0 requirements. The addition amount of the flame retardant is determined on the basis that the flame retardant properties of the cured products meet the requirements of UL 94 V-0 grade, and is not specially limited. Preferably, based on 100 parts of weight of the addition amount of the sum of components (A), (B) and (C), the component (D) is added in an amount of from 5 to 50 parts by weight, , e.g. 6, 11, 16, 21, 26, 31, 36, 41 or 46, preferably from 10 to 30 parts by weight.

Preferably, the phosphorus-containing flame retardant is one selected from or the mixture of at least two selected from tri-(2,6-dimethylphenyl)-phosphine, 10-(2,5-dihydroxylphenyl)-9,10-dihydro -9-oxa-10-phosphaphenanthrene -10-oxide, 2,6-di(2,6-dimethylphenyl) phosphine benzene, 10-phenyl -9,10-dihydro -9-oxa-10-phosphaphenanthrene -10-oxide, phenoxyphazene compound, phosphate, polyphosphate, polyphosphonate and phosphonate-carbonate copolymers.

Preferably, the halogen-free thermosetting resin composition of the present invention further comprises (E) a curing accelerator, which is not specially defined, except catalyzing the reaction of epoxy functional groups and lowering the reaction temperature of the curing system, and is preferably one selected from or the mixture of at least two selected from imidazole compounds, derivatives of imidazole compounds, piperidines, lewis acid and triphenylphosphine, further preferably one selected from or the mixture of at least two selected from 2-methylimidazole, 2-ethyl-4-methylimidazole, 2-phenylimidazole and triphenylphosphine.

The imidazole compounds are one selected from or the mixture of at least two selected from 2-methylimidazole, 2-ethyl-4-methylimidazole, 2-phenylimidazole and 2-undecylimidazole. The piperidines are one selected from or the mixture of at least two selected from 2,3-diamino piperidine, 2,5-diamino piperidine, 2,6-diamino piperidine, 2-amino-3-methyl piperidine, 2-amino-4-methyl piperidine, 2-amino-3-nitro piperidine, 2-amino-5-nitro piperidine and 2-amino-4,4-dimethyl piperidine.

Preferably, based on 100 parts of weight of the addition amount of the sum of components (A), (B), (C) and (D), the component (E) is added in an amount of from 0.01 to 1 part by weight, e.g. 0.05, 0.1, 0.15, 0.2, 0.25, 0.3, 0.35, 0.4, 0.45, 0.5, 0.55, 0.6, 0.65, 0.7, 0.75, 0.8, 0.85, 0.9 or 0.95 part by weight, preferably from 0.05 to 0.8 part by weight, more preferably from 0.05 to 0.6 part by weight.

Preferably, the halogen-free thermosetting resin composition of the present invention further comprises (F) a filler, which is added as required, and the amount of which is not specially limited. The filler is selected from organic fillers and inorganic fillers, preferably from inorganic fillers, more preferably surface-treated inorganic fillers, most preferably surface-treated silica.

The surface-treated surface treating agent is one selected from or the mixture of at least two selected from a silane coupling agent, a silicone oligomer and a titanate coupling agent.

Based on 100 parts by weight of the inorganic fillers, the surface treating agent is in an amount of from 0.1 to 5.0 parts by weight, e.g. 0.4, 0.8, 1.2, 1.6, 2, 2.4, 2.8, 3.2, 3.6, 4, 4.4 or 4.8 parts by weight, preferably from 0.5 to 3.0 parts by weight, more preferably from 0.75 to 2.0 parts by weight.

Preferably, the inorganic fillers are one selected from or the mixture of at least two selected from non-metal oxides, metal nitrides, non-metal nitrides, inorganic hydrates, inorganic salts, metal hydrates and inorganic phosphorus, more preferably are one selected from or the mixture of at least two selected from fused silica, crystalline silica, spherical silica, hollow silica, aluminum hydroxide, alumina, talc, aluminum nitride, boron nitride, silicon carbide, barium sulfate, barium titanate, strontium titanate, calcium carbonate, calcium silicate and mica.

Preferably, the organic fillers are one selected from or the mixture of at least two selected from polytetrafluoroethylene powder, polyphenylene sulfide and polyether sulfone powders.

Preferably, there is no special limitation for the shape and particle size of the fillers. Preferably, the fillers have a median particle diameter of from 0.01 to 50 μm, e.g. 1, 6, 11, 16, 21, 26, 31, 36, 41 or 46μm, preferably from 0.01 to 20 μm, more preferably from 0.1 to 10 μm. The fillers having such particle size are easy to disperse in the varnish.

In addition, the addition amount of the component (F) is not specially limited. Based on 100 parts of weight of the addition amount of the sum of components (A), (B), (C) and (D), the component (F) is added in an amount of from 5 to 300 parts by weight, e.g. 10, 30, 50, 70, 90, 110, 130, 150, 170, 190, 210, 230, 250, 270 or 290 parts by weight, preferably from 5 to 200 parts by weight, more preferably from 5 to 150 parts by weight.

The wording "comprise" in the invention means that, besides said components, there may be other components which endow the halogen-free thermosetting resin composition with different properties. In addition, the wording "comprise" in the present invention may be replaced with "is/are" or "consist of" in a close manner.

For example, the halogen-free thermosetting resin composition may comprise various additives. As specific examples, antioxidants, thermal stabilizers, antistatic agents, ultraviolet light absorbers, pigments, colorants or lubricants may be used. These additives may be used separately or in combination.

The halogen-free thermosetting resin composition of the present invention is conventionally prepared by adding the solids first, then adding liquid solvents, stirring till the solids are completely dissolved, then adding liquid resin and optionally the curing accelerator, continuing to homogeneously stir.

The solvents in the present invention are not specifically limited. As specific examples, alcohols, such as methanol, ethanol, butanol and the like, ethers, such as ethyl cellosolve, butyl cello solve, glycol methylether, carbitol, butyl carbitol, and the like, ketones, such as acetone, butanone, methylethyl ketone, cyclohexanone and the like, aromatic hydrocarbons, such as toluene, xylene, and the like, esters, such as ethyl acetate, ethoxyethyl acetate, and nitrogen-containing solvents, such as N,N-dimethylformamide, N,N-dimethylacetamide and the like can be used. The aforesaid solvents can be used separately, or in combination. Ketones, such as acetone, butanone, methylethyl ketone, cyclohexanone and the like, are preferred. The addition amount of said solvents is determined by those skilled in the art according to their experiences, and it is better to make the resin varnish reach the suitable viscosity.

One object of the present invention is to provide a prepreg comprising a reinforcing material and a halogen-free thermosetting resin composition above which is attached thereon after impregnation and drying.

The reinforcing material used therein is not specially limited. It may be organic fibers, inorganic fiber woven fabrics or non-woven fabrics. Said organic fibers may be aramid fiber non-woven fabrics. Said inorganic fiber woven fabrics may be E-glass fabrics, D-glass fabrics, S-glass fabrics, T-glass fabrics, NE-glass fabrics, or quartz fabrics. The thickness of said reinforcing material is not specially limited. For better size stability of laminates, said woven fabrics and non-woven fabrics have a thickness of preferably from 0.01 to 0.2 mm, and are better to be fibrillated and surface-treated with silane coupling agent. In order to provide better water resistance and thermal resistance, said silane coupling agent is preferably one selected from or the mixture of at least two selected from an epoxy silane coupling agent, an amino-based silane coupling agent or an ethylene silane coupling agent. The above halogen-free thermosetting resin composition is impregnated with the reinforcing material and baked at 100-250° C. for 1-15 min to obtain said prepreg.

One object of the present invention is to provide a laminate comprising at least one prepreg above. The laminate is obtained by binding at least one prepreg together via heating and pressing.

The laminate is prepared by curing in a thermocompressor at a temperature of from 150-250° C. and a pressure of from 10 to 60 Kg/cm².

One object of the present invention is to provide a halogen-free high-frequency circuit board, comprising at least one prepreg above and metal foils coated on one or two sides of the laminated prepreg.

The metal foils are copper foils, nickel foils, aluminum foils, SUS foils, and the like, and the materials thereof are not limited.

As compared with the prior art, the present invention has the following beneficial effects.

In the present invention, the halogen-free thermosetting resin composition uses phosphorus-containing biphenol as the first curing agent. Such phosphorus-containing bisphenol has a high structural symmetry. Moreover, phosphorus in the molecule may react with secondary hydroxyl in epoxy resin, and the cured products have a high Tg and excellent dielectric performance. In addition, such phosphorus-containing bisphenol has a high phosphorus content, and has the effect of halogen-free flame retardance.

Moreover, the halogen-free thermosetting resin composition of the present invention uses alkylphenol novolac as the second curing agent, which sufficiently takes the advantages of excellent dielectric performance and low water absorption due to more alkyl branched chains in the structure thereof, so as to greatly decrease the water absorption of the cured products without sacrificing the Tg and dielectric performance of the cured products.

By using the synergistic effects between phosphorus-containing bisphenol and alkylphenol novolac, the present invention can notably increase the glass transition temperature and thermal resistance of the prepreg and laminated for printed circuit prepared by using such resin composition, and make them have excellent dielectric performance, low water absorption and better process workability. In addition, it can also fulfill the halogen-free flame retardance and achieve UL94 V-0.

The prepreg and laminate for printed circuit prepared from the halogen-free thermosetting resin composition according to the present invention have high glass transition temperature, excellent dielectric properties, low water absorption and high thermal resistance, and can fulfill halogen-free flame retardance and achieve the grade of UL94 V-0.

EMBODIMENTS

The technical solution of the present invention is further disclosed by the following embodiments.

For the laminates (8 prepregs, the reinforcing material which has the model No.2116 and a thickness of 0.08 mm) for printed circuit prepared according to the aforesaid disclosure, the glass transition temperature, dielectric constant, dielectric dissipation factor, peel strength, water absorption, thermal resistance and flame retardancy were tested, which were further disclosed and described detailedly in the following examples.

Please refer to Examples 1-8 and Comparison Examples 1-8. If no special instructions, parts thereafter refer to parts by weight, and % refers to "wt %".

(A) Halogen-free epoxy resin
(A-1) Dicyclopentadiene epoxy resin HP-7200H (produced by DIC, Japan, and having an EEW: 275 g/eq)
(A-2) biphenyl novolac epoxy resin NC-3000H (produced by Nippon Kayaku Co Ltd and having an EEW: 288 g/eq)
(B) First curing agent
(B-1) Phosphorus-containing bisphenol OL1001 (produced by FRX Polymers, U.S., having a phosphorus content of 8.5%)
(B-2) Polyphosphonate OL5000 (produced by FRX Polymers, having a phosphorus content of 10.8%), the structural formula being as follows,

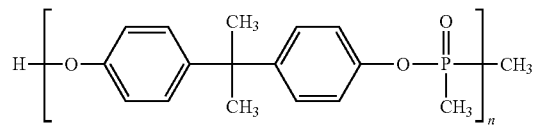

(C) Second curing agent
(C-1) Alkylphenol novolac KPT-F1350E (produced by KOLON, Republic of Korea)
(C-2) Active ester curing agent HPC-8000-65T (produced by Dainippon Ink)
(C-3) Linear novolac 2812 (produced by MOMENTIVE, Republic of Korea)

(D) Phosphorus-containing flame retardant
Phosphorus-containing novolac XZ92741 (produced by DOW, U.S., and having a phosphorus content of 9%)
(E) Accelerator: 2-ethyl-4-methylimidazole (produced by Shikoku Chemicals, Japan)
(F) Filler: fused silica (having an average particle diameter of from 1 to 10 μm and a purity of more than 99%)

(b) Dielectric constant and dielectric dissipation factor: measuring the dielectric constant and dielectric dissipation factor at 1 GHz by the resonance method using a strip line according to IPC-TM-650 2.5.5.5.
(c) Peel strength: measuring the peel strength of the metal cover coat according to the test conditions of "thermal stress" in IPC-TM-650 2.4.8.

TABLE 1

The formula composition and physical property data of each example

|  | Exp. 1 | Exp. 2 | Exp. 3 | Exp. 4 | Exp. 5 | Exp. 6 | Exp. 7 | Exp. 8 |
|---|---|---|---|---|---|---|---|---|
| A-1 | 30 | 45 | 60 | 50 | 50 | — | — | — |
| A-2 | — | — | — | — | — | 30 | 45 | 60 |
| B-1 | 15 | 21 | 24 | 5 | 30 | 12 | 21 | 24 |
| B-2 | — | — | — | — | — | — | — | — |
| C-1 | 30 | 24 | 6 | 25 | 5 | 33 | 24 | 6 |
| C-2 | — | — | — | — | — | — | — | — |
| C-3 | — | — | — | — | — | — | — | — |
| D | 25 | 10 | 10 | 20 | 15 | 25 | 10 | 10 |
| E | q.s. | q.s. | q.s. | q.s. | q.s. | q.s. | q.s. | q.s. |
| F | 40 | 40 | 40 | 40 | 40 | 40 | 40 | 40 |
| Glass transition temperature (DSC) ° C. | 170 | 173 | 179 | 175 | 177 | 172 | 172 | 177 |
| Dielectric constant (1 GHz) | 3.65 | 3.59 | 3.58 | 3.60 | 3.56 | 3.63 | 3.61 | 3.59 |
| Dielectric dissipation (1 GHz) | 0.0078 | 0.0075 | 0.0071 | 0.0081 | 0.0072 | 0.0071 | 0.0068 | 0.0080 |
| Peel strength (N/mm) | 1.31 | 1.35 | 1.36 | 1.32 | 1.35 | 1.30 | 1.30 | 1.37 |
| Water absorption (%) | 0.07 | 0.07 | 0.08 | 0.07 | 0.08 | 0.07 | 0.07 | 0.07 |
| Solder dipping 288° C., s | >120 | >120 | >120 | >120 | >120 | >120 | >120 | >120 |
| Incombustibility | V-0 | V-0 | V-0 | V-0 | V-0 | V-0 | V-0 | V-0 |

TABLE 2

The formula composition and physical property data of Comparison Examples

|  | Com. Exp. 1 | Com. Exp. 2 | Com. Exp. 3 | Com. Exp. 4 | Com. Exp. 5 | Com. Exp. 6 | Com. Exp. 7 | Com. Exp. 8 |
|---|---|---|---|---|---|---|---|---|
| A-1 | 45 | 45 | 45 | 45 | 45 | — | 45 | 45 |
| A-2 | — | — | — | — | — | 45 | — | — |
| B-1 | 45 | — | 21 | 21 | — | — | 20 | — |
| B-2 | — | — | — | — | 21 | 21 | — | — |
| C-1 | — | 45 | — | — | 24 | 24 | — | 25 |
| C-2 | — | — | 24 | — | — | — | — | — |
| C-3 | — | — | — | 24 | — | — | — | — |
| D | 10 | 10 | 10 | 10 | 10 | 10 | 10 | 10 |
| E | q.s. | q.s. | q.s. | q.s. | q.s. | q.s. | q.s. | q.s. |
| F | 40 | 40 | 40 | 40 | 40 | 40 | 40 | 40 |
| Glass transition temperature (DSC) ° C. | 178 | 174 | 162 | 176 | 149 | 152 | 182 | 171 |
| Dielectric constant (1 GHz) | 3.68 | 3.52 | 3.79 | 3.98 | 3.91 | 3.93 | 3.51 | 3.69 |
| Dielectric dissipation (1 GHz) | 0.0060 | 0.0095 | 0.0091 | 0.0102 | 0.0095 | 0.0088 | 0.0059 | 0.0082 |
| Peel strength (N/mm) | 1.51 | 0.95 | 1.35 | 1.35 | 1.38 | 1.36 | 1.41 | 1.10 |
| Water absorption (%) | 0.17 | 0.06 | 0.14 | 0.08 | 0.10 | 0.11 | 0.17 | 0.05 |
| Solder dipping 288° C., s | 75 | >120 | >120 | >120 | >120 | >120 | 91 | >120 |
| Incombustibility | V-0 | V-1 | V-0 | V-0 | V-0 | V-0 | V-0 | V-1 |

The aforesaid properties are tested by
(a) Glass transition temperature (Tg): measuring by differential scanning calorimetry (DSC) according to DSC method specified in IPC-TM-650 2.4.25.

(d) Water absorption: measuring according to IPC-TM-650 2.6.2.1.
(e) Solder dipping: observing the layering and blistering time according to IPC-TM-650 2.4.13.1.

(f) Incombustibility: measuring according to UL 94 vertical burning method.

According to the physical property datas in Tables 1 and 2, phosphorus-containing bisphenol was used separately in Comparison Example 1 to cure dicyclopentadiene epoxy resin. The resultant laminate had a high Tg and excellent dielectric performance, peel strength and flame retardant property, high water absorption, but worse thermal resistance. Alkylphenol novolac was used separately in Comparison Example 2 to cure dicyclopentadiene epoxy resin. The resultant laminate had a high Tg and excellent dielectric performance and thermal resistance, but low water absorption, low peel strength and worse flame retardancy. Phosphorus-containing bisphenol and active ester were used in Comparison Example 3 to co-cure dicyclopentadiene epoxy resin. The resultant laminate had a high Tg, better dielectric performance, and high water absorption. Phosphorus-containing bisphenol and linear novolac were used in Comparison Example 4 to co-cure dicyclopentadiene epoxy resin. The sheet materials had high dielectric constant and dielectric dissipation, so that they cannot meet the requirements of laminates on the dielectric performance in thermosetting high speed field. Polyphosphonate and alkylphenol novolac were used in Comparison Examples 5 and 6 to co-cure dicyclopentadiene epoxy resin and biphenyl novolac epoxy resin respectively. The resultant laminate had a low Tg, worse dielectric performance and high water absorption. Phosphorus-containing bisphenol was used separately in Comparison Example 7 to cure dicyclopentadiene epoxy resin. The resultant laminate had a high glass transition temperature, excellent dielectric performance, and high water absorption, but worse thermal resistance. Alkylphenol novolac was used separately in Comparison Example 8 to cure dicyclopentadiene epoxy resin. The resultant laminate had a high glass transition temperature, better dielectric performance, low water absorption, better thermal resistance, but low peel strength and worse flame retardant property. In Examples 1-8, halogen-free epoxy resin was used as the main part and co-cured with phosphorus-containing bisphenol and alkylphenol novolac. The resultant laminate had a high glass transition temperature, excellent dielectric performance, high thermal resistance, low water absorption. The laminate not only fulfills halogen-free flame retardance, but also achieves the grade of UL94 V-0.

As stated above, the laminate for printed circuit of the present invention, as compared with general laminates, has higher glass transition temperature, more excellent dielectric properties, wet resistance and thermal resistance and is suitable for high-frequency field. In addition, the halogen content can achieve the V-0 standard in the incombustibility test UL94 within the scope of JPCA halogen-free standard requirements, and have the effectiveness of environmental protection.

The applicant declares that, the present invention discloses the detailed method of the present invention by the aforesaid examples, but the present invention is not limited by the detailed method, i.e. it does not mean that the present invention cannot be fulfill unless the aforesaid detailed method is used. Those skilled in the art shall know that, any amendment, equivalent change to the product materials of the present invention, addition of auxiliary ingredients, and selection of any specific modes all fall within the protection scope and disclosure scope of the present invention.

The invention claimed is:

1. A halogen-free thermosetting resin composition, consisting of, based on 100 parts by weight of organic solids, (A) from 30 to 60 parts by weight of a halogen-free epoxy resin, (B) from 5 to 30 parts by weight of a first curing agent of phosphorus-containing bisphenol;

(C) from 5 to 30 parts by weight of a second curing agent of alkylphenol novolac;

(D) a phosphorus-containing flame retardant; and (E) optionally one or more liquid solvents;

the phosphorus-containing bisphenol has the following structure

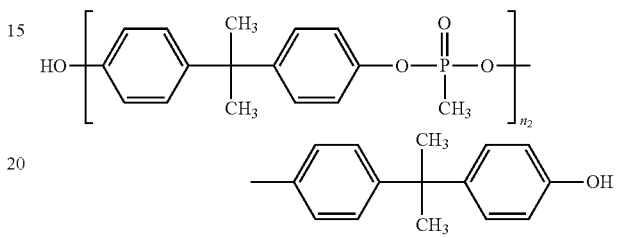

wherein $n_2$ is an integer of 2 to 20; and the alkylphenol novolac has the following structure

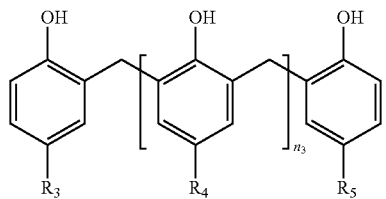

wherein $R_3$, $R_4$ and $R_5$ are all independently selected from substituted or unsubstituted linear or branched alkyl groups having 4-8 carbon atoms; and $n_3$ is an integer from 2 to 20.

2. The halogen-free thermosetting resin composition according to claim 1, characterized in that the halogen-free epoxy resin is one selected from or a mixture of at least two selected from bisphenol-A epoxy resin, bisphenol-F epoxy resin, o-cresol novolac epoxy resin, bisphenol-A novolac epoxy resin, trisphenol novolac epoxy resin, dicyclopentadiene novolac epoxy resin, biphenyl novolac epoxy resin, alkylbenzene novolac epoxy resin and naphthol novolac epoxy resin.

3. The halogen-free thermosetting resin composition according to claim 2, characterized in that the halogen-free epoxy resin is selected from the epoxy resin having the following structure,

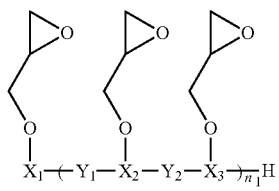

wherein, $X_1$, $X_2$ and $X_3$ are each independently selected from

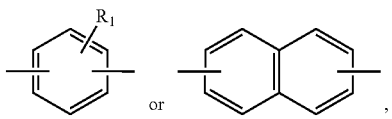

$R_1$ is selected from hydrogen atom, substituted or unsubstituted C1-C5 linear alkyl, and substituted or unsubstituted C1-C5 branched alkyl;

$Y_1$ and $Y_2$ are each independently selected from single bonds, —CH2—,

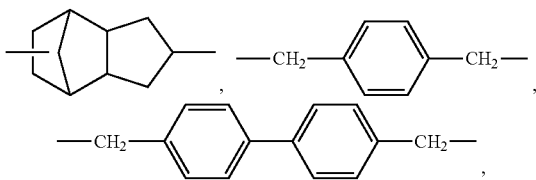

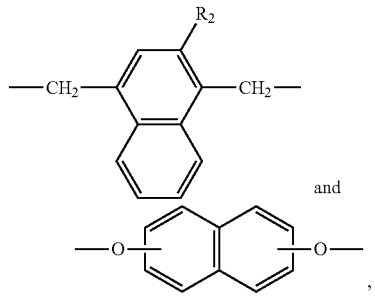

wherein $n_1$ is an integer from 1 to 10; $R_2$ is selected from hydrogen atom, substituted or unsubstituted C1-C5 linear alkyl, and substituted or unsubstituted C1-C5 branched alkyl.

4. A prepreg comprising a reinforcing material and a halogen-free thermosetting resin composition according to claim 2 which is attached thereon after impregnation and drying.

5. A laminate comprising at least one prepreg according to claim 4.

6. The halogen-free thermosetting resin composition according to claim 1, characterized in that the phosphorus-containing bisphenol has a weight average molecular weight of from 1000 to 6500.

7. The halogen-free thermosetting resin composition according to claim 1, characterized in that, based on 100 parts of weight of the addition amount of the sum of components (A), (B) and (C), the component (D) is added in an amount of from 5 to 50 parts by weight.

8. A prepreg comprising a reinforcing material and a halogen-free thermosetting resin composition according to claim 1 which is attached thereon after impregnation and drying.

9. A laminate comprising at least one prepreg according to claim 8.

10. The halogen-free thermosetting resin composition according to claim 1, characterized in that the phosphorus-containing flame retardant is one selected from or a mixture of at least two selected from tri-(2,6-dimethylphenyl)-phosphine, 10-(2,5-dihydroxylphenyl)-9,10-dihydro-9-oxa-10-phosphaphenanthrene-10-oxide, 2,6-di-(2,6-dimethylphenyl) phosphine benzene, 10-phenyl -9,10-dihydro-9-oxa-10-phosphaphenanthrene-10-oxide, phenoxyphosphazene compound, phosphate, polyphosphate, polyphosphonate and phosphonate-carbonate copolymers.

* * * * *